(12) United States Patent
Gautam et al.

(10) Patent No.: US 8,632,621 B2
(45) Date of Patent: Jan. 21, 2014

(54) METHOD FOR MELTING A SOLID CHARGE

(75) Inventors: Vivek Gautam, Bear, DE (US);
Kenneth Kaiser, Bear, DE (US); Luc Jarry, Meudon (FR); Remi Pierre Tsiava, Saint Germain-les-Corbeil (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 66 days.

(21) Appl. No.: 12/982,971

(22) Filed: Dec. 31, 2010

(65) Prior Publication Data

US 2012/0006157 A1    Jan. 12, 2012

Related U.S. Application Data

(63) Continuation-in-part of application No. 12/248,131, filed on Jul. 31, 2010, and a continuation-in-part of application No. 12/848,132, filed on Jul. 31, 2010.

(60) Provisional application No. 61/363,627, filed on Jul. 12, 2010.

(51) Int. Cl.
*C22B 9/05*      (2006.01)
*F23N 1/00*      (2006.01)
*C03B 5/00*      (2006.01)

(52) U.S. Cl.
USPC .................. 75/414; 75/687; 431/2; 431/12

(58) Field of Classification Search
USPC .................... 431/2, 12; 75/687, 414
See application file for complete search history.

(56) References Cited

U.S. PATENT DOCUMENTS

| | | | |
|---|---|---|---|
| 5,554,022 A | 9/1996 | Nabors et al. | |
| 5,570,679 A | 11/1996 | Wunning | |
| 5,636,977 A | 6/1997 | Benson et al. | |
| 5,772,421 A | 6/1998 | Besik et al. | |
| 5,888,458 A * | 3/1999 | Suwa et al. | 266/44 |
| 5,944,507 A | 8/1999 | Feldermann | |
| 5,954,498 A | 9/1999 | Joshi et al. | |
| 5,961,312 A | 10/1999 | Sugiyama et al. | |
| 6,007,326 A | 12/1999 | Ryan, III et al. | |
| 6,039,786 A | 3/2000 | Marles Franco | |

(Continued)

FOREIGN PATENT DOCUMENTS

| | | |
|---|---|---|
| EP | 1 850 067 | 10/2007 |
| EP | 2 080 973 | 7/2009 |

(Continued)

OTHER PUBLICATIONS

International Search Report and Written Opinion for PCT/US2011/065521, mailed Mar. 19, 2012.

(Continued)

*Primary Examiner* — George Wyszomierski
*Assistant Examiner* — Tima M McGuthry Banks
(74) *Attorney, Agent, or Firm* — Christopher J. Cronin

(57) ABSTRACT

A simple, compact burner achieves a more optimal melting of a solid charge followed by performance of combustion under distributed combustion conditions. The burner achieves this by fluidically bending the flame towards the solid charge during a melting phase with an actuating jet of oxidant, redirecting the flame in a direction away from the charge, and staging injection of oxidant among primary and secondary portions during a distributed combustion phase.

20 Claims, 15 Drawing Sheets

(56) References Cited

U.S. PATENT DOCUMENTS

| | | | |
|---|---|---|---|
| 6,394,790 B1 | 5/2002 | Kobayashi | |
| 6,663,380 B2 | 12/2003 | Rabovitser et al. | |
| 6,773,256 B2 * | 8/2004 | Joshi et al. | 431/9 |
| 2003/0148236 A1 | 8/2003 | Joshi et al. | |
| 2006/0272453 A1 | 12/2006 | Soupos et al. | |
| 2007/0254251 A1 | 11/2007 | Cao et al. | |
| 2010/0068666 A1 * | 3/2010 | Zamuner et al. | 431/181 |
| 2010/0276507 A1 | 11/2010 | Labegorre et al. | |
| 2010/0282021 A1 * | 11/2010 | Grant et al. | 75/10.4 |
| 2012/0009531 A1 | 1/2012 | Prabhakar et al. | |

FOREIGN PATENT DOCUMENTS

| | | |
|---|---|---|
| EP | 2 166 284 | 3/2010 |
| WO | WO 2004/029511 | 4/2004 |
| WO | WO 2004 029511 | 4/2004 |
| WO | WO 2006/031163 | 3/2006 |
| WO | WO 2006 031163 | 3/2006 |
| WO | WO 2009087142 A1 * | 7/2009 |
| WO | WO 2009087227 | 7/2009 |
| WO | WO 2009087227 A1 * | 7/2009 |
| WO | WO 2010 023256 | 3/2010 |
| WO | WO 2012 016913 | 2/2012 |

OTHER PUBLICATIONS

Potesser, et al., "Burner Developments of the Messer Group for the Nonferrous Metallurgical Industry," BHM. Berg und Huettenmaennische Monatshefte, Springer, Vienna, AU., vol. 153, No. 3, Jan. 1, 2008, pp. 121-125.

* cited by examiner

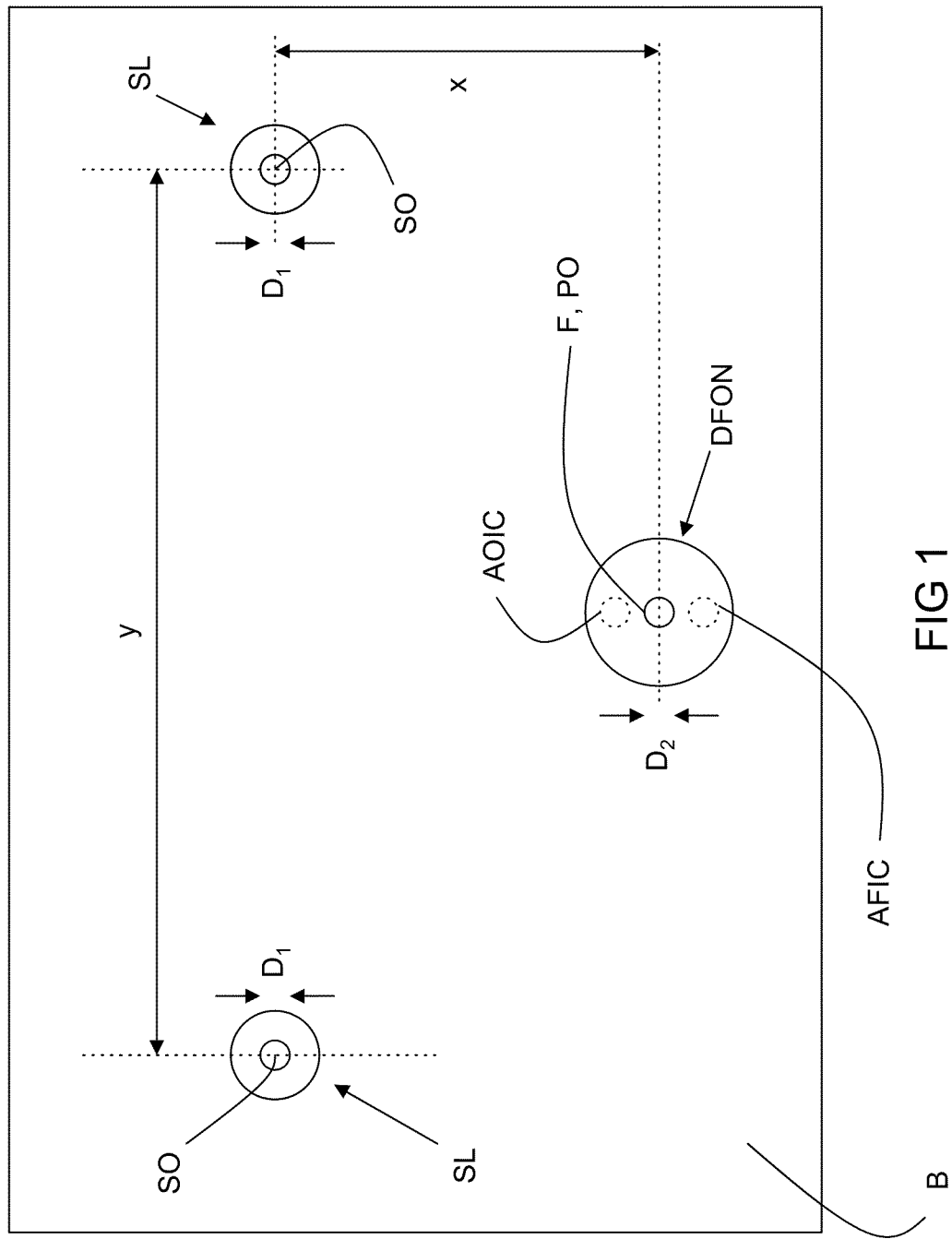

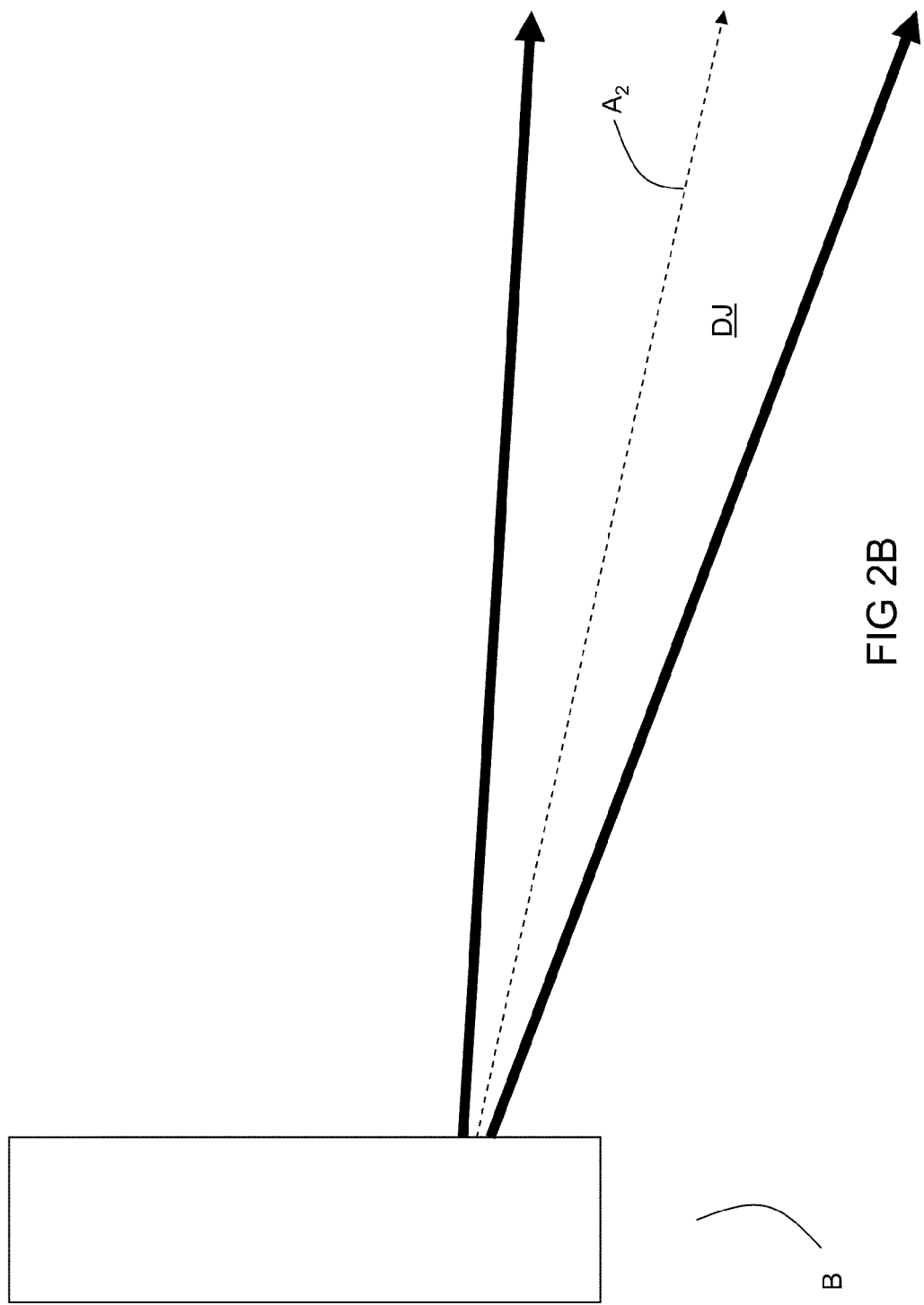

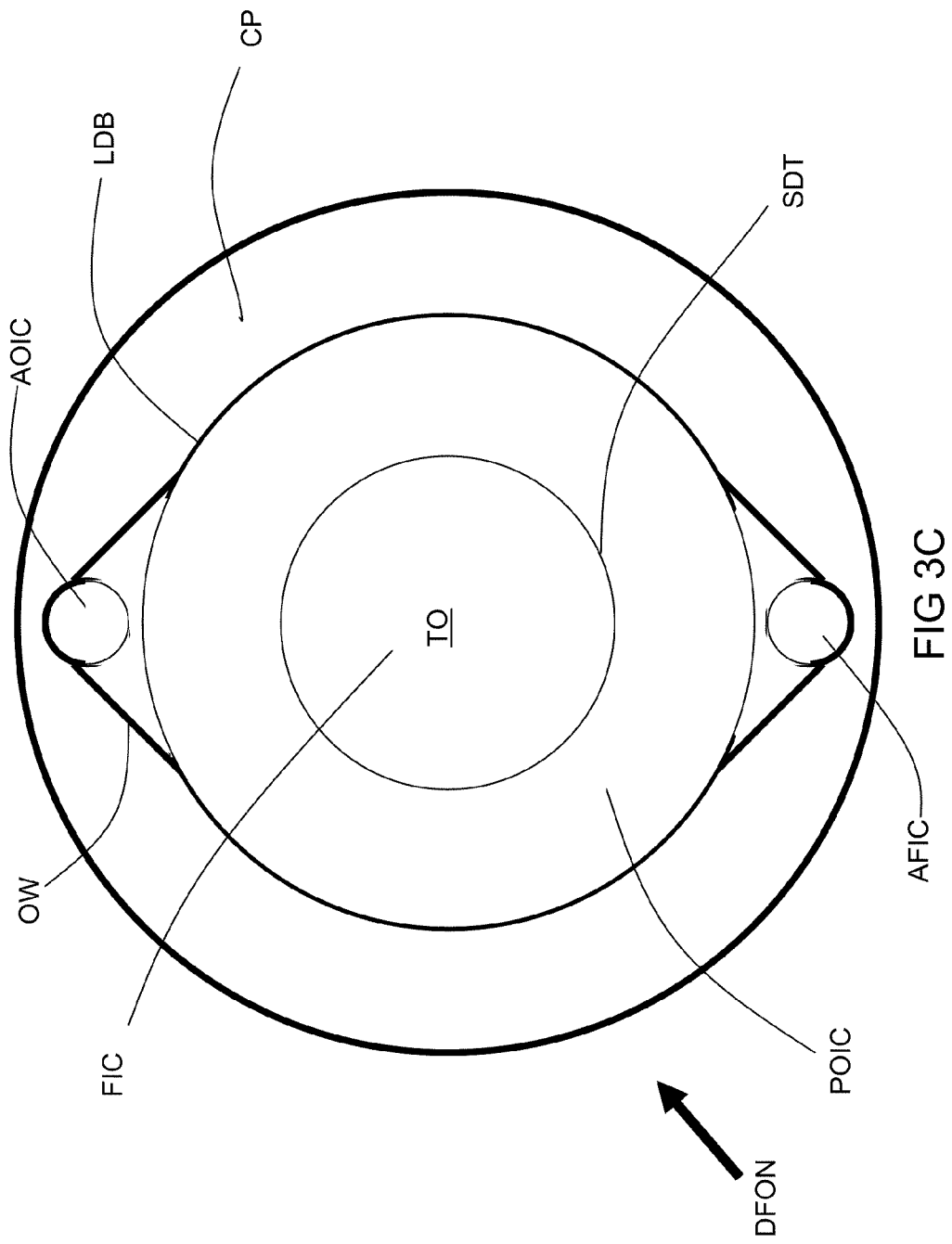

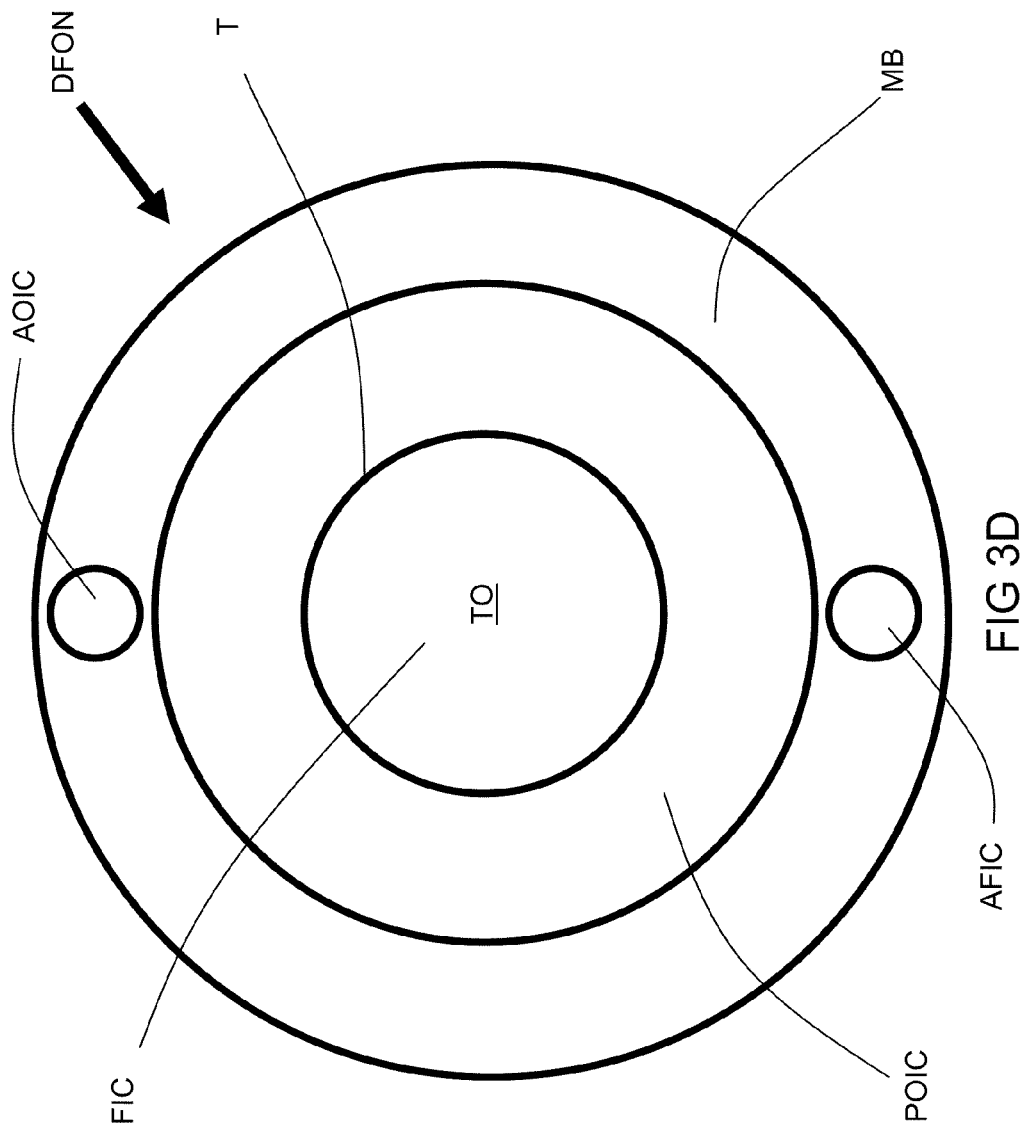

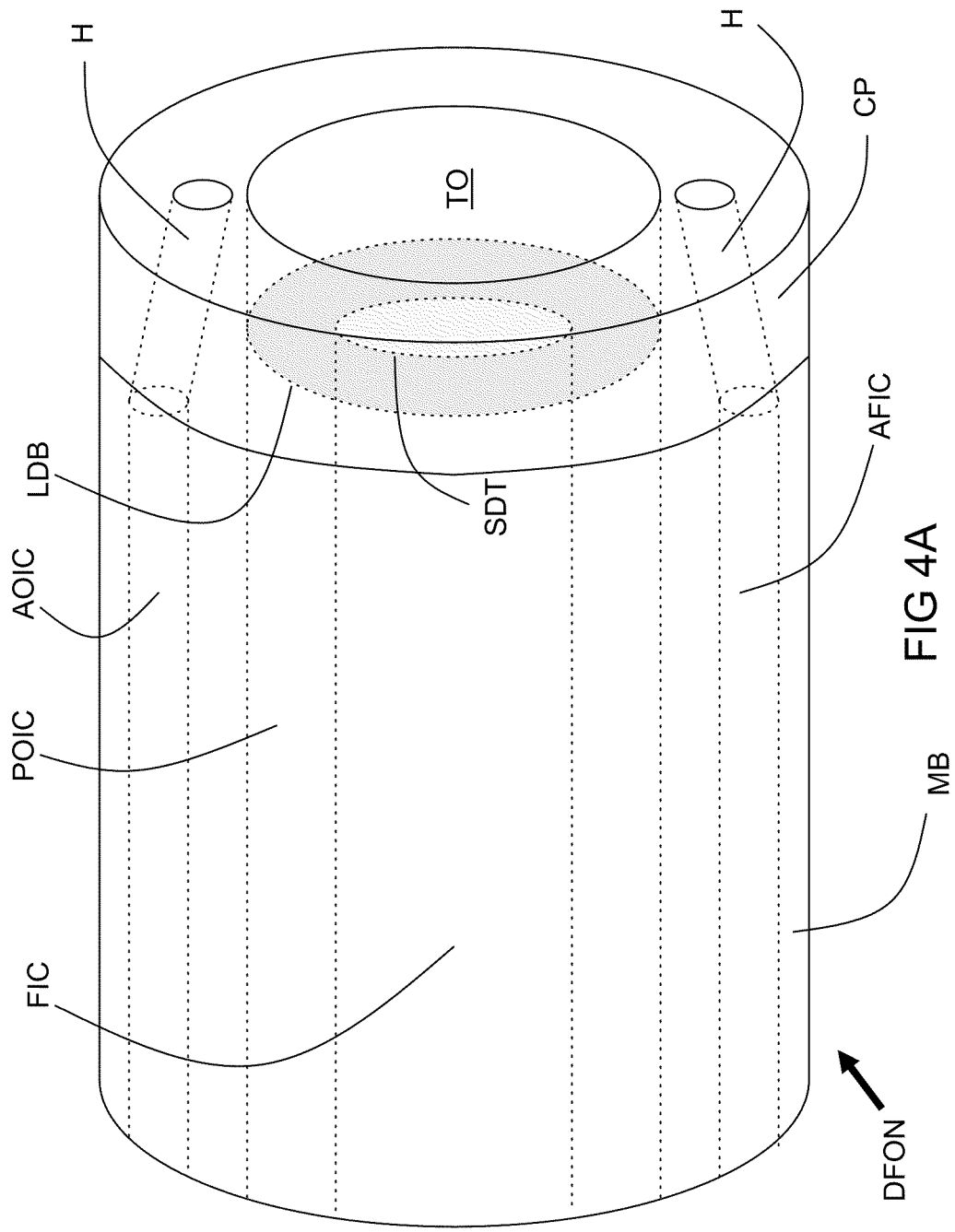

METHOD FOR MELTING A SOLID CHARGE

CROSS-REFERENCE TO RELATED APPLICATIONS

This application is a Continuation-In-Part of co-pending U.S. Non-Provisional patent application Ser. Nos. 12/848,131 filed on Jul. 31, 2010 and 12/848,132 filed on Jul. 31, 2010, each of which claims priority to co-pending U.S. Provisional Patent Application No. 61/363,627 filed on Jul. 12, 2010, the contents of which are incorporated herein in their entireties.

BACKGROUND

The present invention relates to the melting of a solid charge such as glass or metal, and in particular, to the recycling of metal through scrap metal melting and refining.

Scrap metal melting is a major aspect of the metallurgical industry. Indeed, scrap metal is used as raw material for metal melting in the ferrous and in the non-ferrous metallurgical industry for economical, technical and environmental reasons. The development of the metal recycling industry depends largely on the availability of the scrap metal.

A typical example in the field of non-ferrous metallurgy is the recycling of aluminium which is currently the most commonly recycled post-consumer metal in the world. In Europe, for example, aluminium enjoys high recycling rates, ranging from 41% for beverage cans to 85% in the building and construction sector and up to 95% in the automotive sector. The industry is furthermore constantly investing and researching improvements in collection and sorting so as to achieve the best possible levels of recycling.

Aluminium recyclers melt a wide range of aluminium scraps acquired both on the local market and from import. As scrap is usually made of contaminated material of variable composition, the secondary melting industry, such as the scrap aluminium industry, needs production tools, and in particular melting furnaces, which are both powerful and flexible.

A key issue for commercial scrap metal melters is process efficiency. Process efficiency covers in particular the following factors:
time efficiency: i.e. the rate at which a given amount of scrap metal is melted,
energy efficiency: i.e. the energy required for melting a given amount of scrap metal, and
metal recovery efficiency: i.e. the tapped molten metal to scrap metal ratio.

It is known in the art to melt scrap metal in a furnace by means of heat generated by air-combustion, i.e. by combusting a fuel with air as the oxidant. Such melting processes generally present low time and energy efficiency, but relatively high metal recovery efficiency.

Oxy-combustion of fuels is a known strategy for increasing heat utilization (thermal efficiency) in industrial furnaces relative to air-based combustion. Oxy-fuel burners have higher flame temperatures which increase radiative heat transfer from the flame to the load. Higher flame temperatures, however, can have negative consequences in certain circumstances, especially for lower temperature furnaces such as for secondary Aluminum melting. Due to the high flame temperature, the propensity of $NO_x$ formation is increased. Therefore, if $N_2$ enters the combustion zone either through the fuel or due to air infiltration into the furnace, $NO_x$ formation can increase significantly. Also, the higher temperature flame can cause hot spots in the furnace or adversely affect the product quality. In certain cases like melting of Aluminum, the high flame temperature can also increase the rate of metal oxidation, thus resulting in metal losses.

It has been proposed to regulate burner power during the melting process in order to keep metal oxidation under control as far as possible in the case of oxy-combustion, for example as a function of the temperature in the furnace or of the refractory material surrounding the combustion chamber.

To overcome the above issues, distributed combustion has been developed as a strategy for performing oxy-combustion at lower but very uniform temperatures. Also called diluted combustion, mild combustion, or flameless combustion (in certain circumstances when the flame is no longer visible), the central idea of this strategy is to dilute the reactants with furnace gases (mostly mixture of $H_2O$ and $CO_2$) before combustion so as to achieve a lower and more uniform temperature distribution within the furnace. The temperature of the diluted mixtures should be kept above auto-ignition temperature to sustain the flameless mode. Unlike complex interaction between mass transport and chemical reaction observed in conventional combustion processes, the highly diluted reactants make combustion a kinetic-limited process by increasing time scale of the combustion reaction. This slow combustion process manifests itself through highly distributed reaction zones where the peak temperature is low thereby reducing NOx drastically.

Many have proposed burners for distributed combustion. WO2004/029511 utilizes an ejector effect produced by a burner's oxygen nozzles to provide internal recirculation of furnace gases. Downstream injection of fuel allows the oxygen to mix with the furnace gases before reaching the fuel. WO2004/029511 includes 6 oxygen supply pipes placed in a circle around the fuel injection. The oxygen supply pipes preferably deliver oxygen at supersonic velocities.

As with the WO2004/029511 burner, U.S. Pat. No. 6,007,326 concerns combustion with low concentrations of both fuel and oxygen in the furnace. Dilution of the reactants is obtained with spatially separated injections of them at high velocities. The fuel and the oxidant can be preheated to any temperature above ambient.

U.S. Published Patent Application US 20070254251 discloses a burner designed for a flameless combustion regime. It includes several fuel and oxidant injections, playing different roles. A possible central flame stabilizer is surrounded by multiple nozzles for injecting fuel and gaseous oxidant into the furnace or combustion zone. It can use air or oxygen as oxidant.

Some distributed combustion burners utilizing oxygen must rely upon high velocity injections of the reactants. The high velocity injections normally require high pressures of oxygen and natural gas for operation. Because of this drawback, there is a need to achieve distributed combustion with a burner utilizing oxygen at relatively lower pressures.

Regardless of the pressure of the oxidant supply, distributed combustion is usually achieved by separated injection of fuel and oxidant into the furnace. Either one or both reactant jets are injected into the furnace in such a way as to facilitate entrainment of furnace gases into the jets, e.g. by using high velocity gradients, swirling flows or bluff bodies. The distance between the jets is determined with the objective of achieving sufficient dilution of one or both reactants before the two reactant streams interact/mix with each other. For example, U.S. Pat. No. 5,961,312 discloses a burner design wherein the distance between the fuel and air jets, L, is given by the equation: $(L/D_a) \times [(V_a/V_o)^{-.5}] > 10$, where $D_a$ is the diameter of the air nozzle, $V_a$ is the velocity of air and $V_o$ is unit velocity of air (1 m/s). Similarly, U.S. Pat. No. 6,007,326 requires a distance of at least 6 inches and preferably 24 inches between fuel and oxidant jets to achieve diluted combustion conditions for low $NO_x$ production. These spacing requirements between jets can often make burners prohibitively large and bulky.

Sometimes, a non-zero angle of injection between the reactant nozzles is also used to delay mixing of the reactants until they are diluted by furnace gases. For example, U.S. Pat. No. 5,772,421 discloses a burner design in which the fuel and oxidant are discharged such that they initially diverge away from each other but eventually mix within the furnace. However, the mixing of the diverging jets is dependent upon furnace geometry, burner operation and the location of the burner within the furnace. As a result, these burners are often effective only in certain specific furnaces and under specific operating conditions.

Another strategy to achieve distributed combustion is to distribute one of the reactants in the furnace by using multiple nozzles. The other reactant is usually supplied as a high velocity or high swirl jet to entrain furnace gases. For example, U.S. Pat. No. 6,773,256 discloses a burner in which a small quantity of fuel is supplied into the oxidant stream to achieve a fuel-lean flame. The remaining fuel is supplied via multiple fuel nozzles at fixed distances from the flame. The fuel nozzles can be designed to inject the fuel at different angles to the flame depending on the staging desired. Such a design strategy can result in a relatively large, complex burner that can be relatively expensive to manufacture and hard to control.

Because of the above-described drawbacks, there is a need to achieve distributed combustion with a simple, compact burner.

One of the important conditions for achieving highly staged combustion is high furnace temperature. In order to maintain complete combustion inside the combustion chamber for highly staged combustion, the furnace must be preheated to above the auto-ignition temperature, typically greater than 700° C. or greater than 800° C. Most of the highly staged burners require a preheater burner for achieving desired furnace temperatures prior to staging. For example, WO 2006/031163 discloses a burner that can be operated in both flame and staged mode. Initially when the furnace is cold, fuel and oxidant are injected from coaxial opening (pipe-in-pipe) to have a stable flame. Once the furnace temperature reaches the auto-ignition temperature of fuel, the fuel and oxidant are injected from openings that are spatially separated from each other to have a distributed combustion inside the furnace. The issue with almost all of the staged burner designs is their often poor performance at burner powers other than nominal design power. Typically these burners operate very well at nominal power conditions, however, their combustion efficiency and emission characteristics often decline significantly the moment burner power is changed from nominal to some other power. Such a change in burner power is a very common scenario for most industrial furnaces.

Because of the above-described drawback, there is also a need for a burner that can achieve satisfactory distributed combustion at a variety of burner powers.

SUMMARY

There is disclosed a process for melting a solid charge in a furnace, said process comprising the following steps. A solid charge comprising glass or metal is fed to the furnace. A jet of fuel and a primary portion of oxidant is injected into a furnace from a fuel/oxidant nozzle in a burner block. The jet of fuel and primary oxidant is caused to be directed downward towards the solid charge by initiating injection of a jet of a first actuating fluid downwards towards the jet of fuel and primary oxidant thereby impinging the jet of fuel and primary oxidant, the first actuating fluid being a further portion of oxidant. Upon the melting of a desired amount of the solid charge, injection of the jet of the first actuating fluid is discontinued. An amount of oxidant injected from the fuel/oxidant nozzle as primary oxidant is reduced while injection of a secondary portion of oxidant from a pair of secondary lances disposed in the burner block above the fuel/oxidant nozzle is initiated until a desired degree of staging of oxidant injection between primary and secondary oxidant and distributed combustion conditions are achieved. The molten charge is withdrawn from the furnace.

The method may include one or more of the following aspects.
- the furnace is a rotary furnace having a substantially cylindrical refractory wall, a first end wall at one end of the cylindrical refractory wall and a second end wall at the opposite end of the cylindrical refractory wall.
- the solid charge is scrap metal selected from the group consisting of aluminum, copper, zinc, lead, nickel, cobalt, titanium, chromium, precious metals, and alloys thereof.
- the scrap metal is aluminum or an alloy of aluminium.
- the fuel is a gaseous fuel.
- the fuel is selected from the group consisting of natural gas, butane, propane, and mixtures thereof.
- the oxidant has an oxygen content of at least 65% vol/vol.
- the oxidant has an oxygen content of at least 80% vol/vol.
- the oxidant has an oxygen content of at least 90% vol/vol.
- injection of the jet of the first actuating fluid is discontinuing upon the melting of substantially all of the solid charge.
- the fuel is fuel oil.
- the secondary portion of fuel makes up 90-95% of a total amount of fuel to yield a desired degree of staging is 90-95%.
- a power of the burner is increased while continuing to combust the fuel and oxidant under distributed combustion conditions by:
    proportionally increasing the amount of oxidant injected through the pair of secondary lances as secondary oxidant and through the fuel/oxidant nozzle as primary oxidant; and
    initiating injection of a jet of a second actuating fluid upwards towards the jet of fuel and primary oxidant thereby impinging the jet of fuel and primary oxidant, the second actuating fluid being a further portion of the fuel, the second actuating fluid making up 1-20% vol/vol of a total flow of fuel injected from the fuel/oxidant nozzle and as the second actuating fluid.
- the primary portion of fuel annularly enshrouds the primary portion of oxidant and the combustion reactant of the second jet is fuel.
- the secondary portion of oxidant makes up 90-95% of a total amount of oxidant to yield a desired degree of staging is 90-95%.
- during at least a portion of time in which said method is performed under distributed combustion conditions, a temperature of the furnace is above the auto-ignition temperature of the fuel.
- the fuel/oxidant nozzle is a concentrically arranged pipe-in-pipe nozzle adapted and configured to inject the fuel from an inner pipe and inject the primary portion of oxidant from an annulus between the inner pipe and an outer pipe.

during at least a portion of time in which said method is performed under distributed combustion conditions, no visible flame is observable.

the fuel is fuel oil.

during at least a portion of time in which said method is performed under distributed combustion conditions, the secondary portion of oxidant injected from the secondary lances makes up 90-95% of a total amount of oxidant injected as a primary portion of oxidant from the fuel/oxidant nozzle and from the secondary lances.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a schematic elevation view of the disclosed burner illustrating hidden parts that includes a dynamical fuel/oxidant nozzle and a pair of secondary oxidant lances.

FIG. 2B is a schematic of a melting phase of the disclosed solid charge melting process where a flame is directed towards a solid charge.

FIG. 3C is a cross-sectional view of the nozzle of FIG. 4A taken along line C-C illustrating hidden parts.

FIG. 3D is a cross-sectional view of the nozzle of FIG. 4A taken along line D-D.

FIG. 4A is a schematic isometric view of a second embodiment of a fuel/oxidant nozzle of the disclosed burner.

DESCRIPTION OF PREFERRED EMBODIMENTS

Figure 2A:
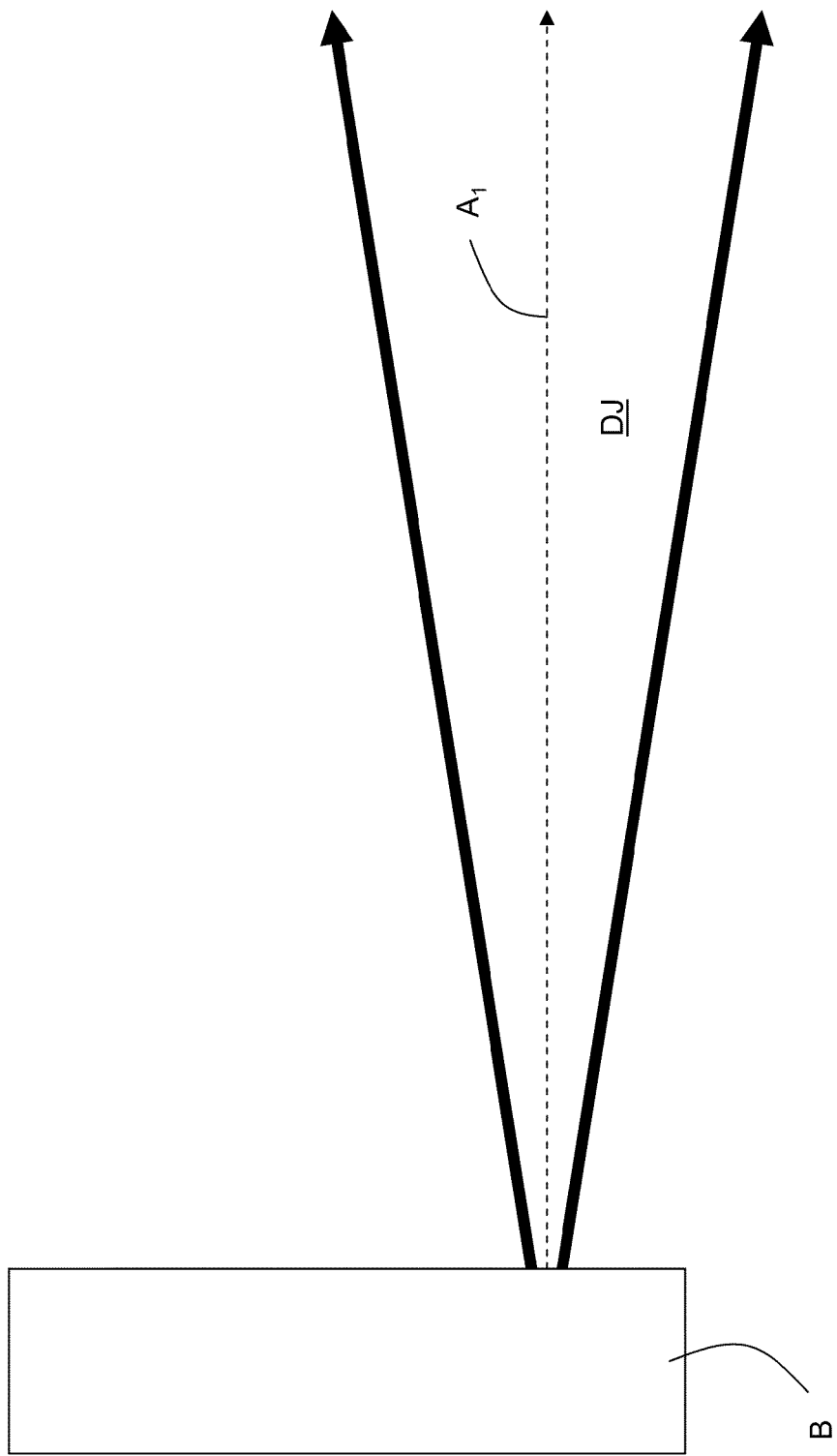
FIG. 2A is a schematic of a startup phase of the disclosed solid charge melting process where a flame is oriented straight out from the burner.
Figure 2C:
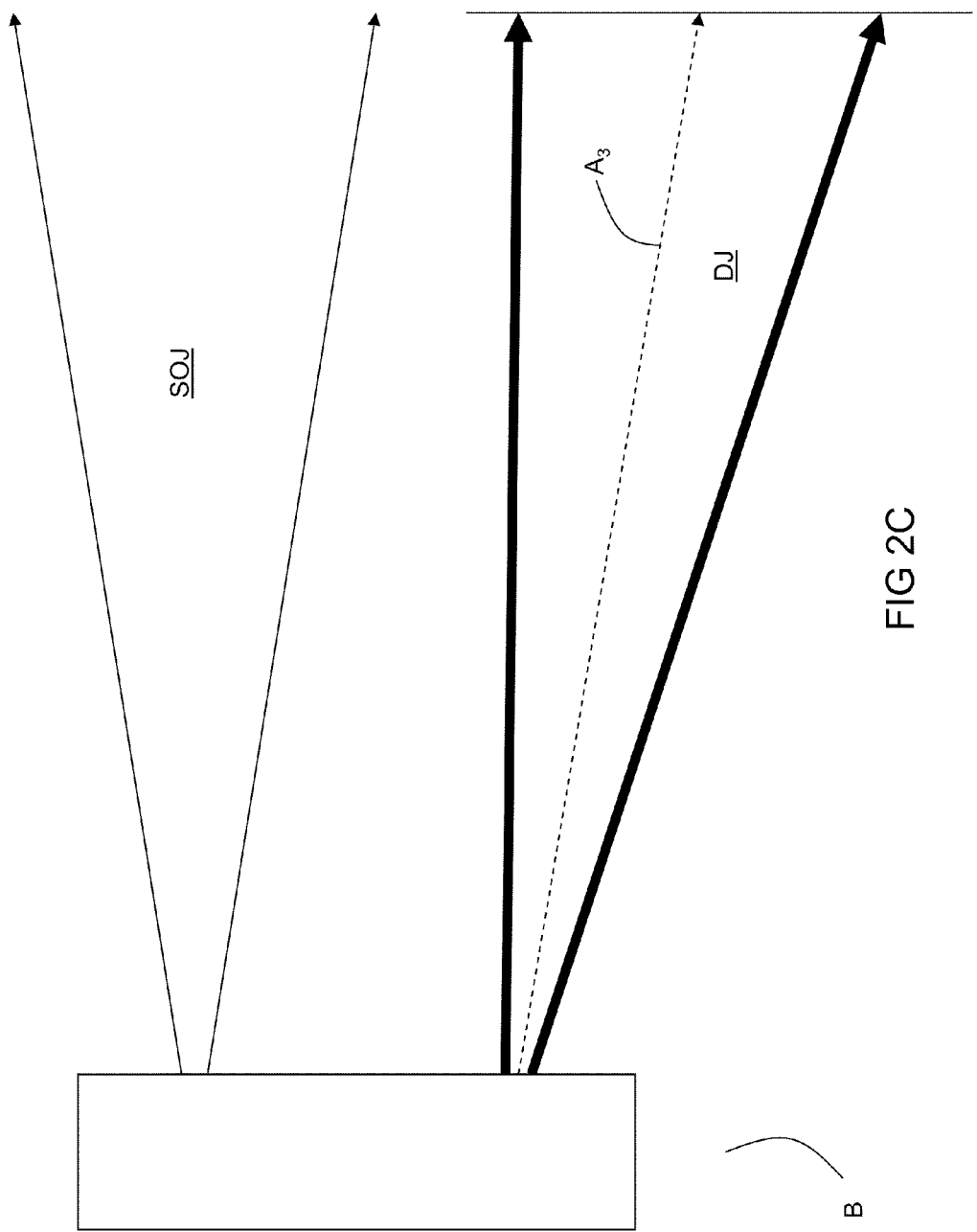
FIG. 2C is a schematic of a beginning portion of transition from a melting phase to a distributing combustion phase of the disclosed solid charge melting process where staging of the oxidant between primary and secondary portions is initiated.
Figure 2D:
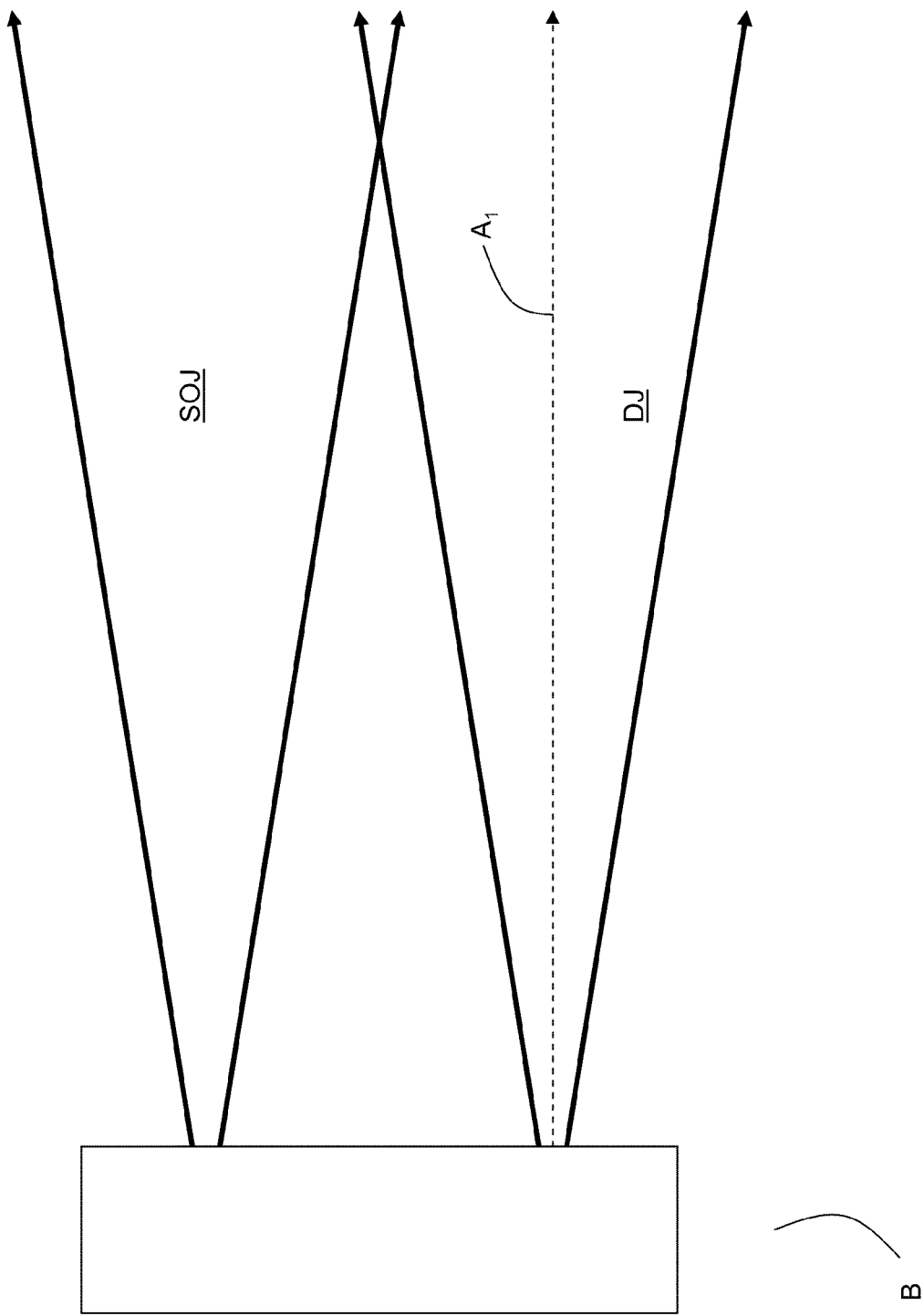
FIG. 2D is a schematic of an ending portion of a transition from a melting phase to a distributing combustion phase of the disclosed solid charge melting process where staging of the oxidant between primary and secondary portions is more complete.
Figure 2E:
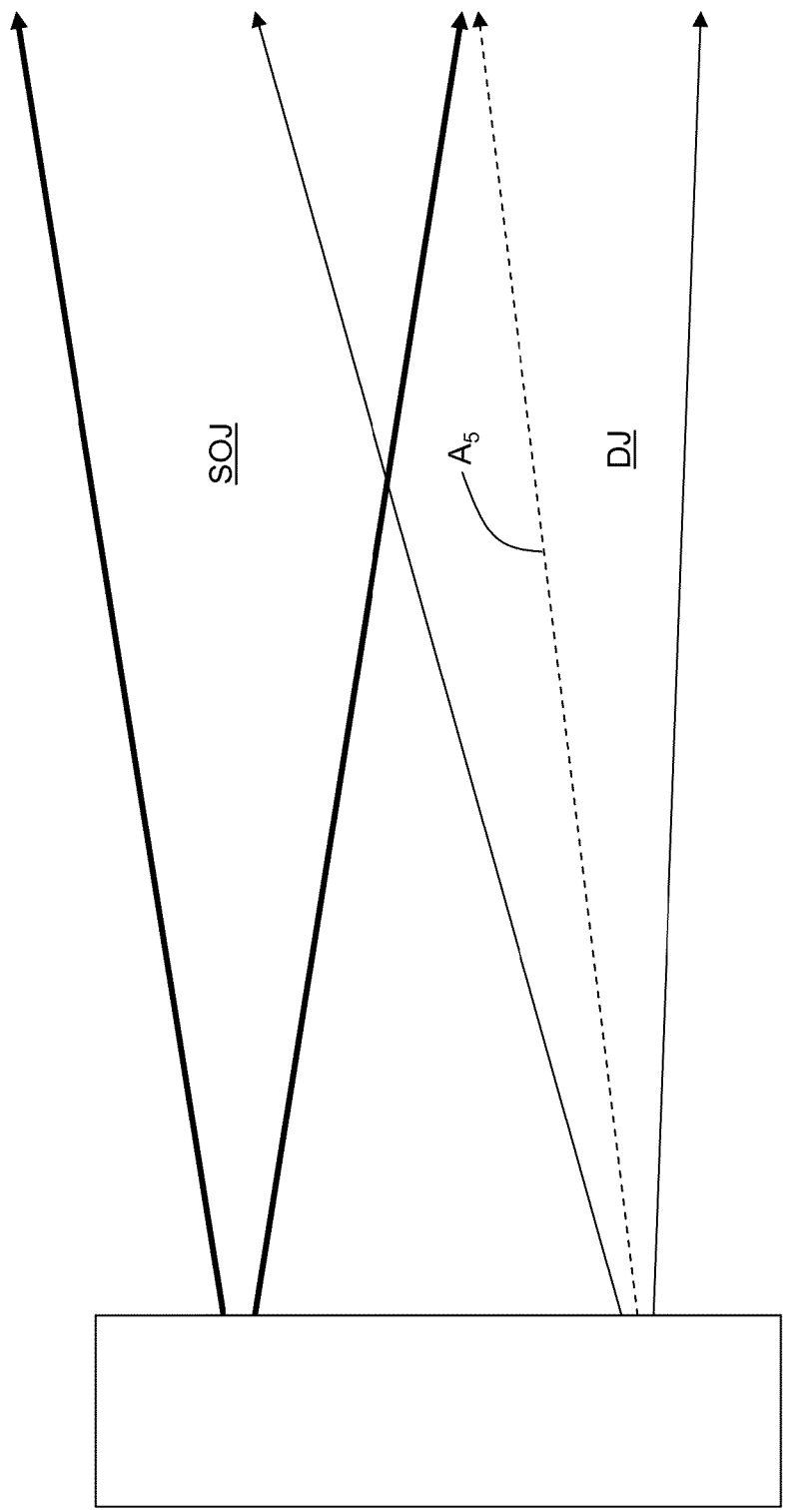
FIG. 2E is a schematic of a distributing combustion phase of the disclosed solid charge melting process where staging of the oxidant between primary and secondary portions is complete.
Figure 3A:
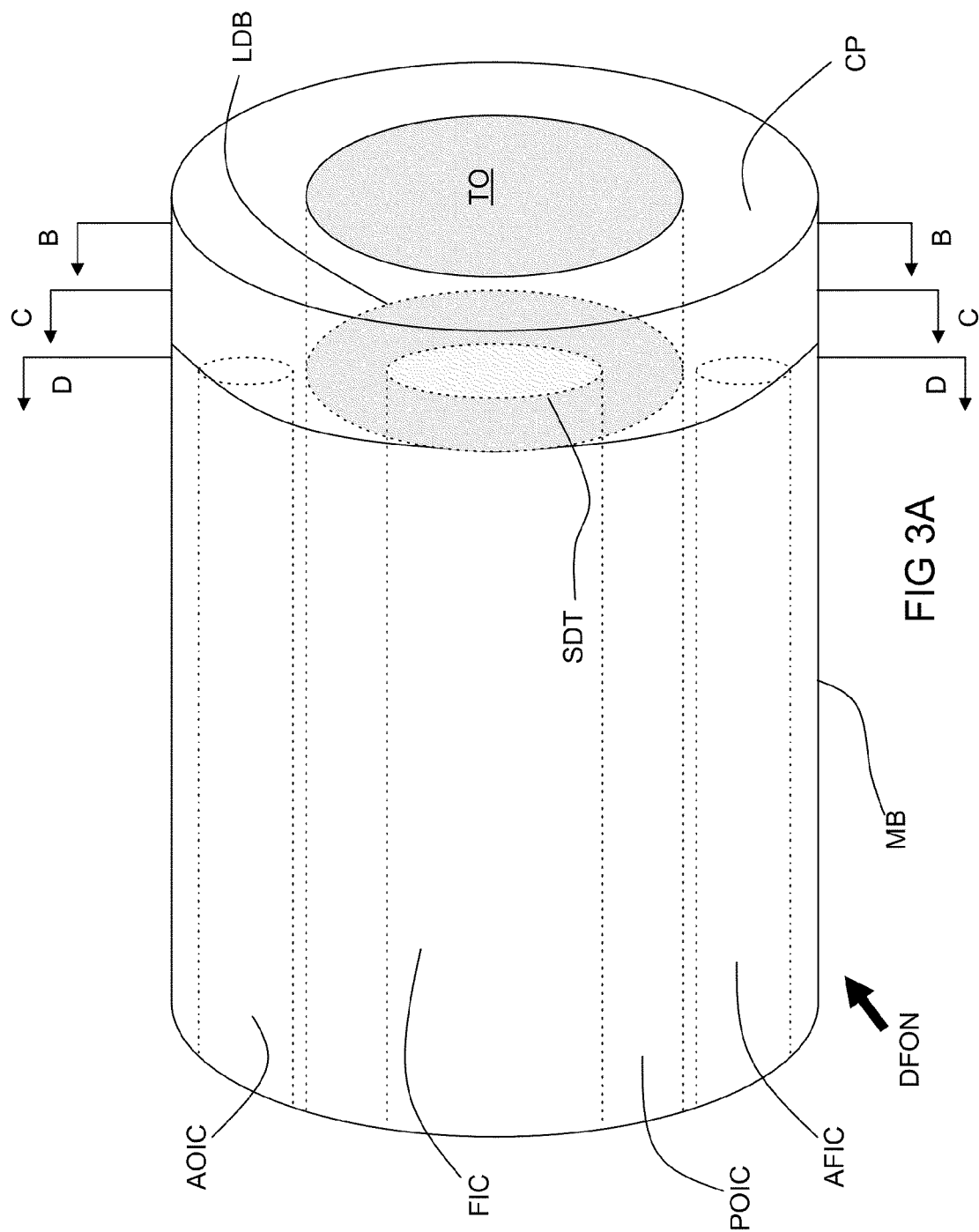
FIG. 3A is a schematic isometric view of a first embodiment of a fuel/oxidant nozzle of the disclosed burner.
Figure 3B:
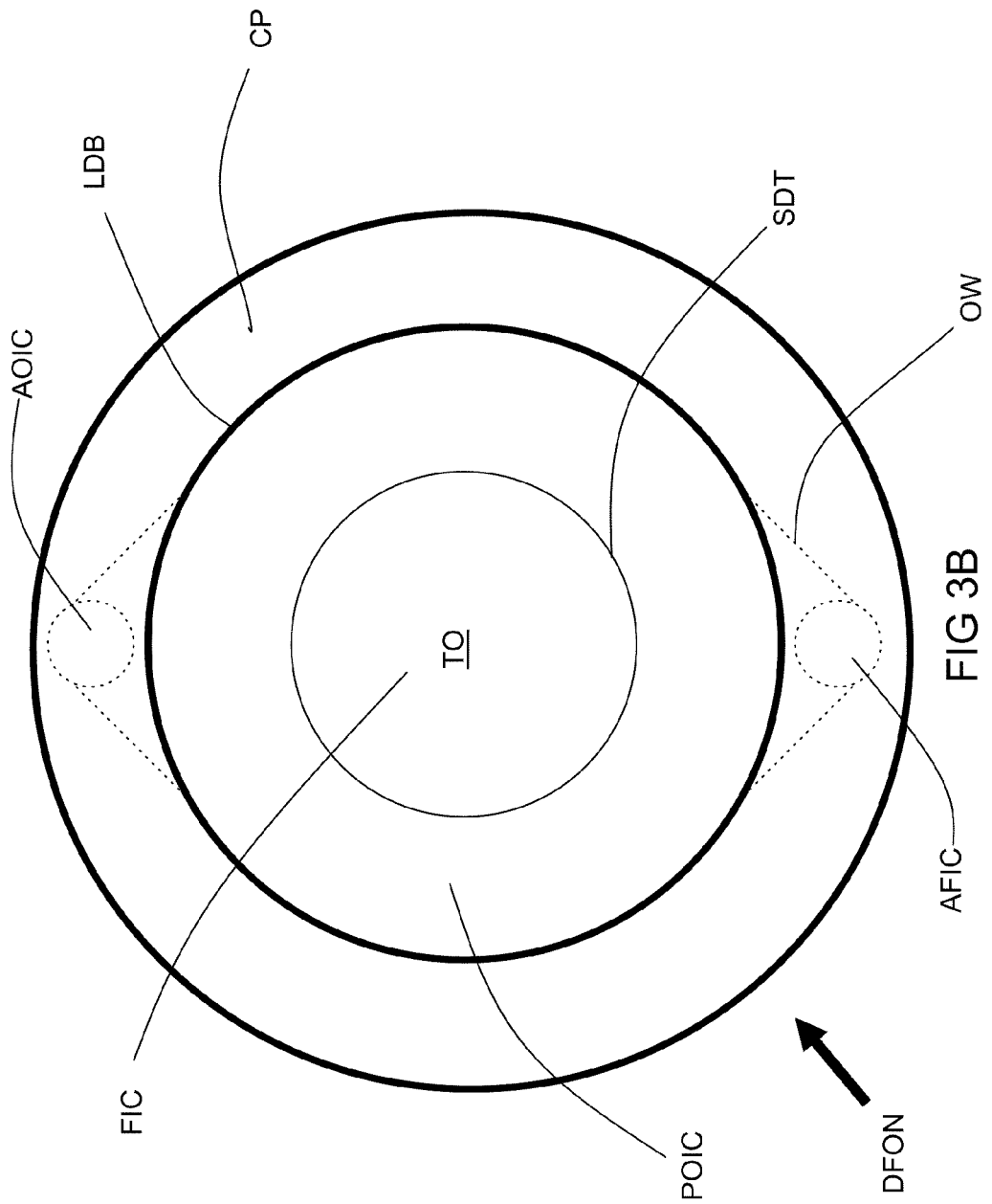
FIG. 3B is a cross-sectional view of the nozzle of FIG. 4A taken along line B-B illustrating hidden parts.
Figure 3E:
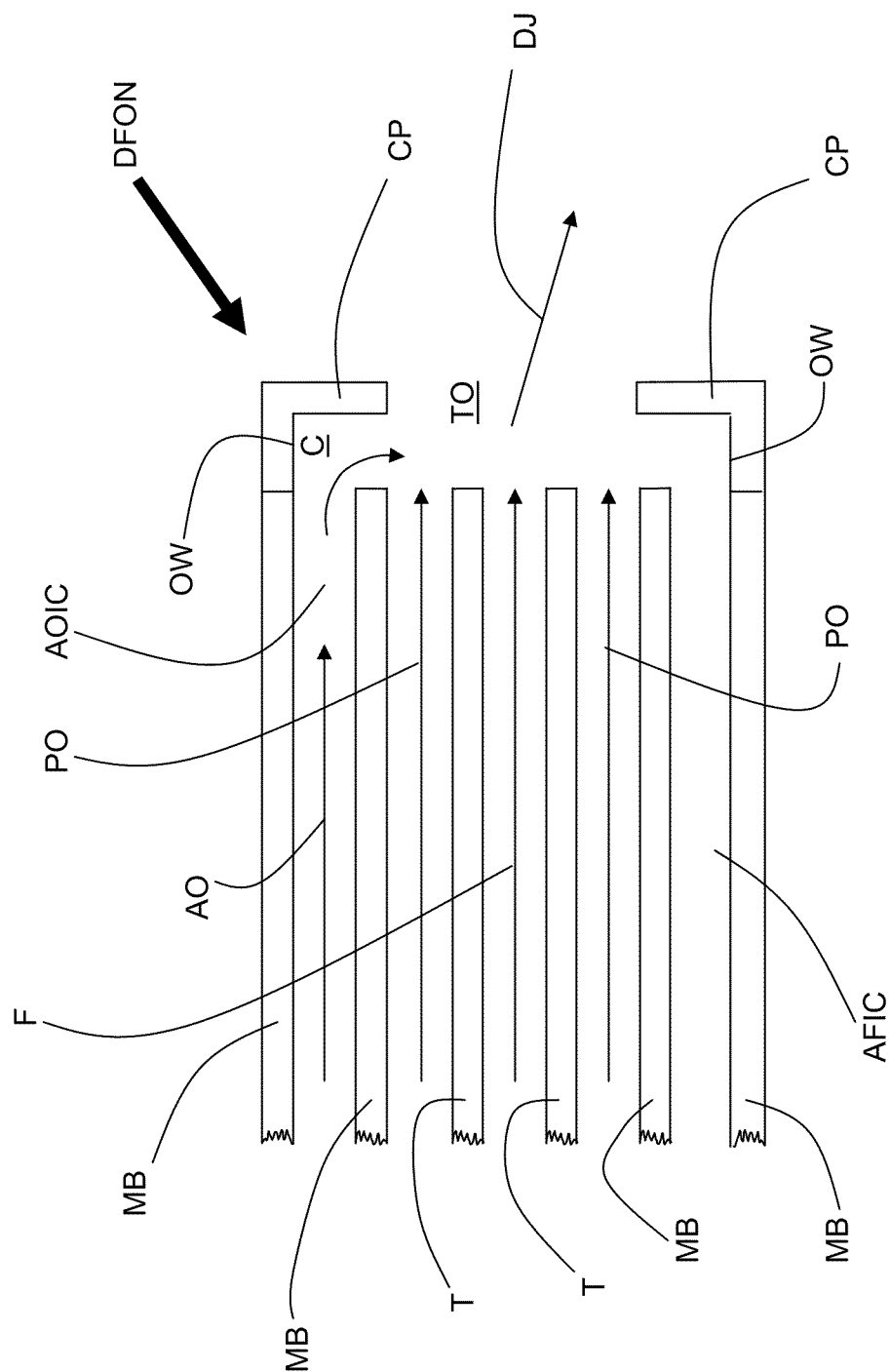
FIG. 3E is a schematic elevation view of a lengthwise slice taken of the nozzle of FIG. 3A during a melting phase of the disclosed solid charge melting process.
Figure 3F:
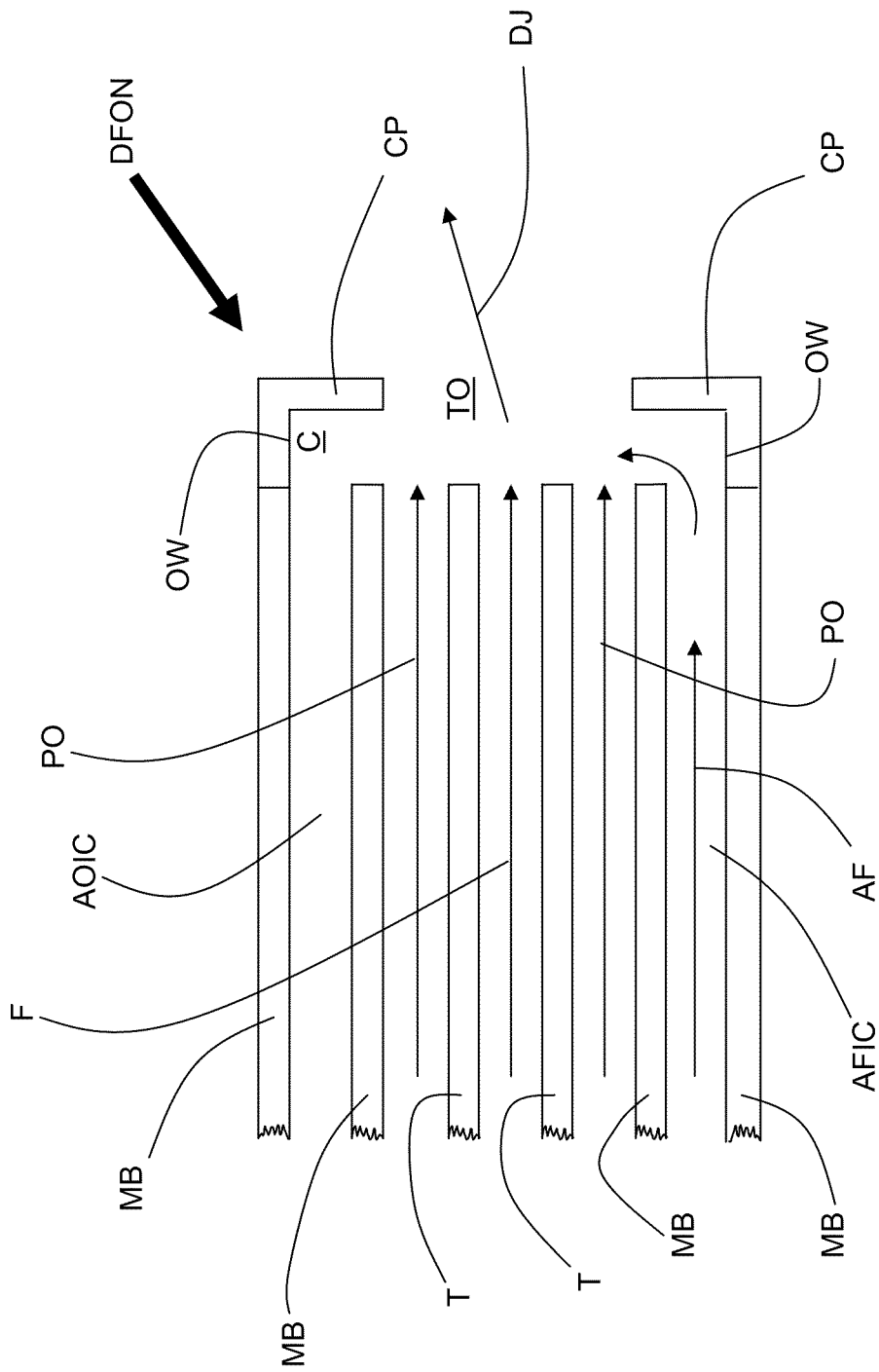
FIG. 3F is a schematic elevation view of a lengthwise slice taken of the nozzle of FIG. 3A during a distributed combustion phase of the disclosed solid charge melting process under a relatively high burner power.

There is disclosed a simple, compact burner for achieving a more optimal melting of a solid charge followed by performance of combustion under distributed combustion conditions. This is achieved by fluidically bending the flame towards the solid charge during a melting phase with an actuating jet of oxidant, redirecting the flame in a direction away from the charge, and staging injection of oxidant among primary and secondary portions during a distributed combustion phase. Additionally, when a higher burner power is needed during the distributed combustion phase, an actuating jet of fuel is initiated to bend the flame upwards and avoid over-delaying of the mixing of the fuel and oxidant.

During startup, a jet of fuel and a primary oxidant is injected into a melting furnace by dynamical fuel/oxidant nozzle extending through a burner block. If the furnace does not already contain a solid charge, a solid charge is added to the furnace for melting.

When desired, and especially after a stable flame is produced, a valve is opened to initiate a flow of an oxidant to an actuating oxidant injection channel extending through the burner block in the dynamical fuel/oxidant nozzle. A jet of the actuating oxidant is injected downwardly towards the jet of fuel and primary oxidant causing said jet to be directed downwardly towards the solid charge. Thus commences the melting phase of the process.

Upon the melting of a desired amount of the solid charge and a furnace temperature greater than the auto-ignition temperature of the fuel is reached (typically greater than 700° C. or greater than 800° C.), a transition begins from the melting phase to the distributed combustion phase of the process. Injection of the jet of the actuating oxidant is discontinued. As a result, the flame is no longer downwardly directed towards the charge. Also, an amount of oxidant injected from the fuel/oxidant nozzle as primary oxidant is reduced while injection of a secondary portion of oxidant from a pair of secondary lances disposed in the burner block above the fuel/oxidant nozzle is initiated until a desired degree of staging of oxidant injection between primary and secondary oxidant and distributed combustion conditions are achieved. These conditions are continued through the distributed combustion phase. During the distributed combustion phase, typically 90-95% of the overall amount of the oxidant is injected as the secondary portion or secondary oxidant (from the secondary lances) while only 10-5% is injected as the primary portion or primary oxidant (from the dynamical fuel-oxidant nozzle). If desired, the degree of staging may be varied in an empirical manner to result in no visible flame (i.e., flameless combustion). Lower degrees of staging are also possible, depending upon the degree of distributed combustion desired. Additionally, lower degrees of staging may be desirable if a relatively shorter flame is necessary due to furnace geometry constraints.

After the molten charge is heated by the burner during the distributed combustion phase, it is withdrawn from the furnace. In the case of a solid charge of aluminum (such as scrap aluminum), the molten aluminum is withdrawn for casting and cast.

During operation of the burner at nominal powers in the distributed combustion phase, the flow rate of the secondary oxidant from the secondary lances is typically 95-99% (by volume) of the total flow of oxidant leaving the flow rate of the primary oxidant from the dynamical fuel/oxidant nozzle at 5-1% (by volume) of the total flow of oxidant. During operation of the burner at relatively higher powers in the distributed combustion phase, the flow rate of the actuating fuel is typically 1-20% (by volume) of the total flow of fuel from the dynamical fuel-oxidant nozzle leaving the flow rate of the fuel from the dynamical fuel/oxidant nozzle at 99-80% (by volume) of the total flow of fuel. During operation of the burner during the melting phase, the flow rate of the actuating oxidant is typically 5-30% (by volume) of the total flow of oxidant from the dynamical fuel/oxidant nozzle (and optionally the secondary lances) leaving the flow rate of the primary oxidant in the jet of fuel and primary oxidant at 95-70% (by volume) of the total flow of oxidant. The velocity of the actuating fluid is typically 100 m/s or less at nominal burner power, while the fuel and primary oxidant velocities are typically 100-200 m/s and 75-150 m/s, respectively, at nominal burner power.

While the oxidant may be air, pure oxygen, oxygen-enriched air, or synthetic air comprising oxygen and recycled flue gas, typically it is oxygen having a purity of at least 65% (by volume) or at least 80% (by volume) or industrially pure oxygen having a purity of at least 90% (by volume). While the fuel may be any gaseous or liquid fuel, typically it is natural gas or fuel oil. The primary oxidant typically comprises 75-100% of the total oxidant flow rate of the burner during the heating phase, but only 0-10% of the total oxidant flow rate of the burner during the distributed combustion phase. On the other hand, the secondary oxidant typically has a velocity of 75-200 m/s at nominal burner power and comprises as much as 90-100% at combustion chamber temperatures during the distributed combustion phase.

The secondary lances are disposed above the dynamical fuel-oxidant nozzle. Typically, a minimum distance between a center of the dynamical fuel-oxidant nozzle and a center of each secondary lance should be at least 10 times the inside diameter of the secondary lance or of the centrally disposed tube in the dynamical fuel-oxidant nozzle. Similarly, the minimum distance between the center of the secondary lances should be at least 10 times the inside diameter of those lances.

A higher burner power during the distributed combustion phase may be desired. Because the velocities of the jets of fuel and secondary oxidant are increased, mixing of the two combustion reactants may be overly delayed resulting in impingement of the flame against the furnace wall. To ameliorate this problem, a flow of the fuel is initiated through an actuating fuel injection channel extending through the burner block in the dynamical fuel/oxidant nozzle. A jet of the actuating fuel is injected from the actuating fuel injection channel upwardly towards the jet of fuel (and primary oxidant if any) causing said jet to be directed upwardly towards the jets of secondary oxidant and earlier mixing of the two jets.

In a first embodiment of the dynamical fuel/oxidant nozzle, the jet of actuating oxidant or fuel may impinge the jet of fuel and primary oxidant (if any) before said jet exits the dynamical lance. In a second embodiment of the dynamical fuel/oxidant nozzle, the jet of actuating oxidant or fuel may impinge the jet of the fuel and primary oxidant (if any) after said jet exits the dynamical lance.

The first embodiment of the dynamical fuel-oxidant nozzle employs a main nozzle body having a centrally disposed larger-diameter bore extending therethrough. Concentrically disposed within the large-diameter bore is a smaller-diameter tube so as to create a centrally disposed fuel injection channel surrounded by an annularly-shaped primary oxidant injection channel. Hence, it forms a tube-in-tube type configuration where an annular flow of primary oxidant flows in an annular space between an inner surface of the main nozzle body and an outer surface of the tube and a central flow of the fuel flows through the tube. One of ordinary skill in the art will recognize that the flows of fuel and primary oxidant may be switched so that the fuel annularly shrouds the primary oxidant. The main nozzle body also includes an actuating oxidant injection channel extending therethrough above and spaced apart from the annular space. The main nozzle body also includes an actuating fuel injection channel extending therethrough below and spaced apart from the annular space. The terminus of the main nozzle body is covered with a cap. The cap has a terminal opening oriented along the axis of the tube and bore and generally sized to match the diameter of the bore so that the flow of the primary oxidant and fuel continues through the terminal opening of the cap.

The cap may include a cavity on the side facing the terminus of the nozzle body. The cavity extends in the axial direction of the cap (upstream to downstream) to terminate at a flat surface lying in a plane perpendicular to the axis of the bore and tube. The fuel and primary oxidant flow out the terminal ends of the tube and annular space and out the terminal opening in the cap. The cavity also extends in the radial direction outward far enough so that it fluidly communicates with the outlet of the actuating oxidant and fuel injection channels. Thus, as the actuating oxidant or fuel exits the respective injection channel, the flat surface of the cavity redirects the direction of the flow of actuating oxidant or fuel so that it intersects the flow of the fuel and primary oxidant at about a right angle.

Instead of a cavity, the cap may be drilled with holes whose ends match up between the outlets of the actuating fluid injection channels and the terminal opening of the cap. Thus, the actuating fluid flows from the outlet of the actuating fluid injection channel(s) into the hole(s) and intersects, at an angle, the flow of the fuel and oxidant. The angle may be a right angle or an acute angle greater than 0°.

Regardless of whether the cap employs a cavity or holes, as the actuating oxidant injection channel is disposed above the bore, the actuating oxidant flows downwardly towards the jet of fuel and primary oxidant causing the flame to be directed downwardly towards the charge to be melted. Conversely, as the actuating fuel injection channel is disposed below the bore, the actuating fuel flows upwardly towards the jet of fuel and primary oxidant causing the flame to be directed upwardly towards the jets of secondary oxidant.

The angle to which the flame is directed downwardly or upwardly may be controlled by controlling the flow rate and velocity of the actuating oxidant or actuating fuel, respectively, through the appropriate injection channel. Typically, the jet of second reactant or enshrouded jet of fuel and oxidant is bent from its normal axis up to 40°, more typically up to 30°, even more typically up to 20°, yet more typically up to 15°, and most typically up to 5° or 10°.

The second embodiment of the dynamical fuel-oxidant nozzle may employ a main nozzle body again having a centrally disposed large-diameter bore and a smaller-diameter tube concentrically disposed within the large-diameter bore. Again, the fuel flows through the tube while the primary oxidant flows through the annular space in between an inner surface of the bore and the outer surface of the tube to annularly shroud that reactant at the outlet of the tube and bore. One of ordinary skill in the art will recognize that the flows of fuel and primary oxidant may be switched so that the fuel annularly shrouds the primary oxidant. The dynamical fuel-oxidant nozzle also includes an actuating oxidant injection channel extending through the main nozzle body above and spaced from the bore and an actuating fuel injection channel extending through the main nozzle body below and spaced from the bore. The terminus of the main nozzle body is covered with a cap. The cap has a terminal opening oriented along the axis of the centrally disposed bore and tube and generally sized to match a diameter of the bore so that the flow of the fuel and primary oxidant through the centrally disposed concentric tubes continues through the terminal opening of the cap.

The cap also includes holes drilled through it, a first end of which matches up with an outlet of a respective actuating oxidant or fuel injection channel and a second end of which extends through the terminal end of the cap spaced away from the terminal opening of the cap. The holes are drilled at an acute angle towards the axis of the centrally disposed concentric tubes, but the holes do not intersect the terminal opening of the cap. Thus, the actuating oxidant or fuel flows from the outlet of the respective injection channel into the respective hole and exits out the cap in the form of a jet at an angle to the jet of the fuel and primary oxidant. The jet of actuating oxidant or fuel intersects the jet of the fuel and primary oxidant after said jet exits the dynamical fuel-oxidant nozzle.

Thus, as the actuating oxidant injection channel is disposed above the bore, the actuating oxidant flows downwardly towards the jet of fuel and primary oxidant causing the flame to be directed downwardly towards the charge to be melted. Conversely, as the actuating fuel injection channel is disposed below the bore, the actuating fuel flows upwardly towards the jet of fuel and primary oxidant causing the flame to be directed upwardly towards the jets of secondary oxidant.

The angle to which the flame is directed downwardly or upwardly may be controlled by controlling the flow rate and velocity of the actuating oxidant or actuating fuel, respectively, through the appropriate injection channel. Typically, the jet of second reactant or enshrouded jet of fuel and oxidant is bent from its normal axis up to 40°, more typically up to 30°, even more typically up to 20°, yet more typically up to 15°, and most typically up to 5° or 10°.

Because the points of injection of the two jets are spaced apart, the bent/diverted jet/jets has/have a greater opportunity to entrain furnace gases and thus becomes diluted before it/they reacts/react with the other portion of reactant injected by the burner in primary and secondary portions. Such dilution results in a lower overall temperature within the furnace and a greater temperature homogeneity within the furnace. Thus, it results in distributed combustion, and in some cases flameless combustion.

While the above-described dynamical fuel/oxidant nozzles are suitable for directing the flame downward or upward in distributed combustion conditions or in combustion conditions other than distributed combustion, other techniques for fluidically bending a jet of fluid are known, such as those taught by U.S. Published Patent Application No. US 20100068666 A1, the contents of which are incorporated herein in its entirety.

Several embodiments of the inventive process will now be described.

As best shown in FIGS. 2A-2E, during startup, a dynamical jet DJ of fuel and primary oxidant is injected from the burner B along a fuel injection axis $A_1$. In the melting phase, the dynamical jet DJ is caused to be directed downwardly along an axis $A_2$ towards a solid charge in a melting furnace by the impingement of the jet of the actuating oxidant. At the beginning of the transition from the melting phase to the distributed combustion phase, injection of an amount of a secondary portion of oxidant is initiated from secondary lances to form secondary oxidant jet SOJ. At the same time, the amount of oxidant injected as an actuating oxidant jet and as part of the jet of fuel and primary oxidant is decreased by a corresponding amount. As a result, the degree to which the flame is directed downwardly is decreased and the jet of fuel and primary oxidant is oriented along axis $A_3$. At the conclusion of the transition between the two phases, more oxidant is injected through the secondary lances and no oxygen is injected as actuating oxidant and little to no oxidant is injected as primary oxidant. As a result, the flame is no longer directed downwardly and the jet of fuel and primary oxidant is oriented once again along axis $A_1$. Because of the spaced injections of the secondary oxidant jet SOJ and the dynamical jet DJ, mixing of the two jets is delayed. This results in entrainment of significant amounts of furnace gas in the dynamical jet and the achievement of distributed combustion conditions.

While FIGS. 2A-2E illustrate the injection of the secondary oxidant jet SOJ while the dynamical jet DJ is still being directed downwardly by the actuating oxidant, an operator may instead discontinue the flow of the actuating oxidant and increase the flow of the primary oxidant by a corresponding amount to restore the dynamical jet to its original injection axis $A_1$. Also, the downwardly directed dynamical jet DJ along axis $A_2$ may be discontinued entirely and the burner restarted with no flow of actuating oxidant so that the dynamical jet DJ is once again injected along axis $A_1$.

Several embodiments of the inventive burner will now be described.

As best shown in FIG. 1, an embodiment of the inventive burner includes two secondary lances SL and a dynamical fuel/oxidant nozzle DFON in a burner block B. The dynamical fuel/oxidant nozzle DFON includes a concentric tube-in-tube type nozzle for injection of a jet of fuel F annularly shrouded by primary oxidant PO. Actuating oxidant may be injected from an actuating oxidant injection channel AOIC while actuating fuel may be injected from an actuating fuel injection channel AFIC. The secondary lances SL are equally spaced to opposite sides of the dynamical fuel-oxidant nozzle DFON. If the inside diameter $D_1$ of the centrally disposed nozzles of the secondary lances SL is smaller than the inside diameter $D_2$ of the inner tube of the fuel-oxidant nozzle DFON, then each of the centers of the secondary lances SL is separated from the center of the dynamical fuel-oxidant nozzle DFON by a vertical distance x which is at least 10 times $D_1$. If $D_1$ is larger than $D_2$, x is at least 10 times $D_2$. The centers of the secondary lances SL should also be separated by a horizontal distance y which is at least 10 times the smaller of $D_1$ and $D_2$.

One type of dynamical fuel-oxidant nozzle DFON suitable for use in the inventive methods and burners is shown in FIGS. 3A-3F. The dynamical fuel-oxidant nozzle DFON may employ a main nozzle body MB having a centrally disposed larger-diameter bore LDB extending therethrough. Concentrically disposed within the large-diameter bore LDB is a smaller-diameter tube SDT so as to create a centrally disposed fuel injection channel FIC surrounded by an annularly-shaped primary oxidant injection channel POIC. Hence, it forms a tube-in-tube type configuration where an annular flow of primary oxidant flows in an annular space between an inner surface of the main nozzle body MB and an outer surface of the tube SDT and a central flow of the fuel flows through the centrally disposed fuel injection channel FIC.

The main nozzle body MB also includes an actuating oxidant injection channel AOIC extending therethrough above and spaced apart from the annularly-shaped primary oxidant injection channel POIC. The main nozzle body MB also includes an actuating fuel injection channel AFIC extending therethrough below and spaced apart from the annularly-shaped primary oxidant injection channel POIC. The terminus of the main nozzle body is covered with a cap CP.

The cap CP has a terminal opening TO aligned with the axis of the tube SDT and bore LDB and generally sized to match the diameter of the bore LDB so that the flow of fuel F and primary oxidant PO continues through the terminal opening TO of the cap CP. The cap includes a cavity C on the side facing the terminus of the nozzle body MB. The cavity C extends in the axial direction of the cap CP (upstream to downstream) to terminate at a flat surface lying in a plane perpendicular to the axis of the dynamical fuel-oxidant nozzle DFON.

With continuing reference to FIGS. 3A-3F, the fuel F and primary oxidant flow PO out the terminal ends of the centrally disposed fuel injection channel FIC and annularly-shaped primary oxidant injection channel POIC, respectively, and out the terminal opening TO in the cap CP. The cavity also extends in the radial direction outward far enough so that it fluidly communicates with the outlet of the injection channels AOIC, AFIC. Thus, as the actuating oxidant or fuel exits the respective injection channel AOIC, AFIC, the flat surface of the cavity redirects the direction of the flow of the actuating oxidant or fuel AO, AF so that it intersects the flow of the fuel and primary oxidant at about a right angle. Because the jet of actuating oxidant or fuel AO, AF intersects the jet of the fuel and primary oxidant, said jet is caused to be bent/diverted downwardly or upwardly (as the case may be) away from the jet of actuating oxidant or fuel.

Figure 4B:
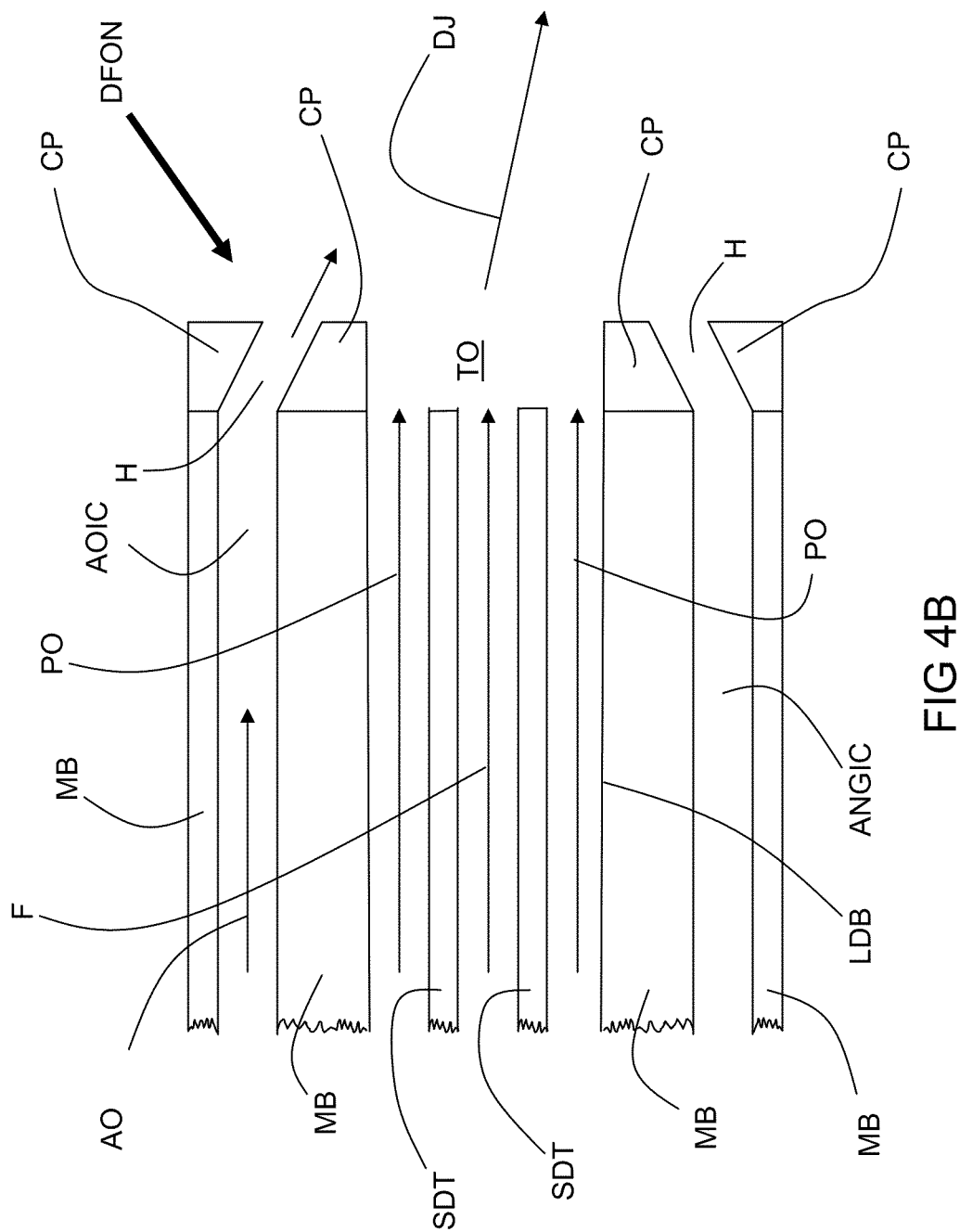
FIG. 4B is a schematic elevation view of a lengthwise slice taken of the nozzle of FIG. 4A during a melting phase of the disclosed solid charge melting process.
Figure 4C:
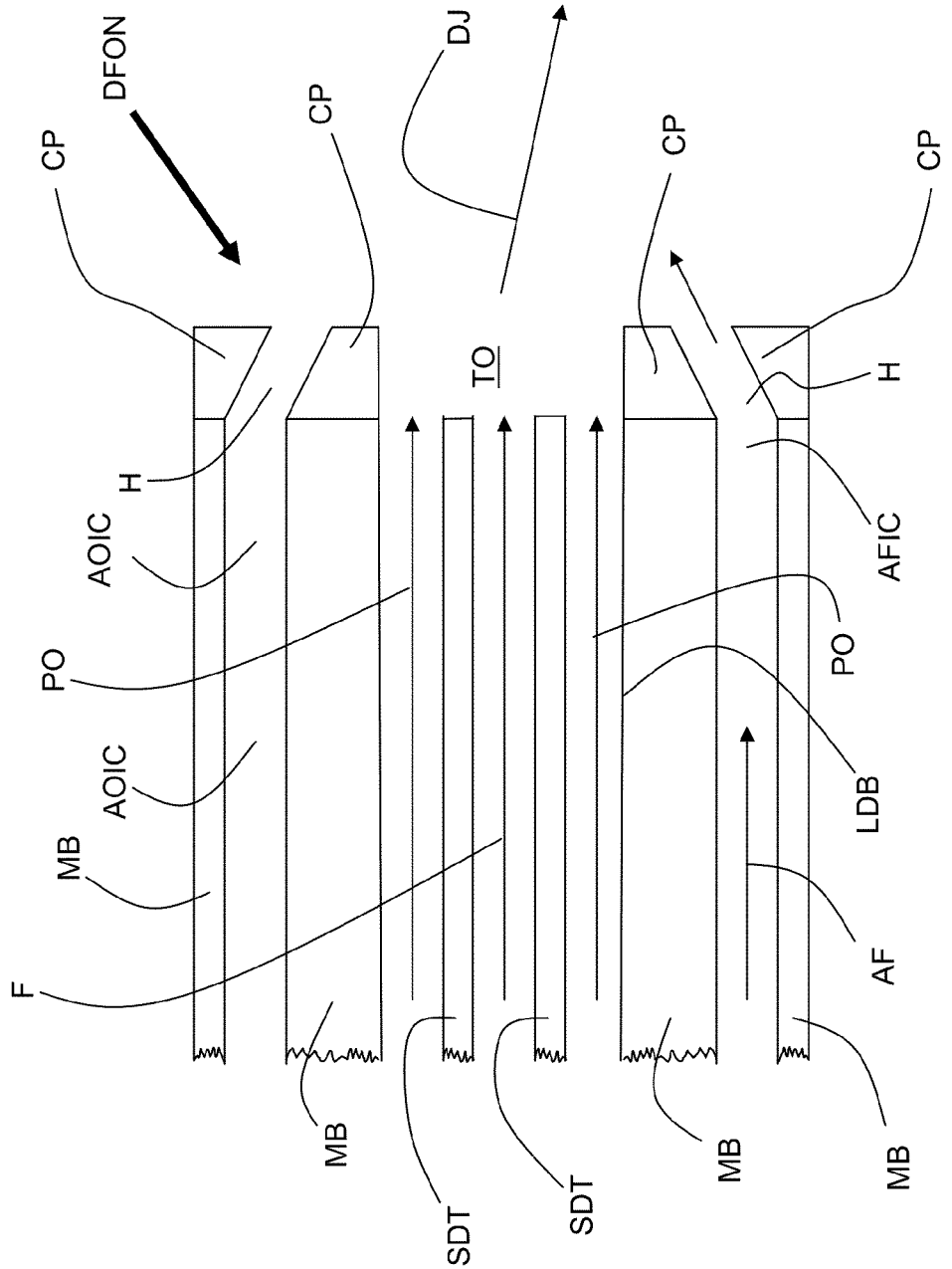
FIG. 4C is a schematic elevation view of a lengthwise slice taken of the nozzle of FIG. 4A during a distributed combustion phase of the disclosed solid charge melting process under a relatively high burner power.

Another type of dynamical fuel-oxidant nozzle DFON suitable for use in the inventive methods and burners is shown in FIGS. 4A-4C. The dynamical fuel-oxidant nozzle DFON includes a main nozzle body MB having a centrally disposed large-diameter bore LDB and a smaller-diameter tube SDT concentrically disposed within the large-diameter bore LDB. The fuel F flows through a centrally disposed fuel injection channel FIC forming the interior of the smaller-diameter tube SDT while the primary oxidant PO flows through the annularly-shaped primary oxidant injection channel POIC in between an inner surface of the bore LDB and the outer surface of the tube SDT to annularly shroud that reactant at the outlet of the tube SDT and bore LDB.

The dynamical fuel-oxidant nozzle DFON also includes an actuating oxidant injection channel AOIC and an actuating fuel injection channel FIC extending therethrough main nozzle body MB. The terminus of the main nozzle body MB is covered with a cap CP. The cap CP has a terminal opening TO aligned with the axis of the bore LDB and tube SDT and generally sized to match a diameter of the bore LDB so that the flow of the fuel F and primary oxidant PO through the centrally disposed fuel injection channel FIC/annularly-shaped primary oxidant injection channel POIC continues through the terminal opening TO of the cap CP. The cap CP also includes two holes H drilled through it, a first end of which matches up with an outlet of a respective injection channel AOIC, AFIC and a second end of which extends through the terminal end of the cap CP spaced away from the terminal opening TO of the cap CP.

With continuing reference to FIGS. 4A-4C, the holes H are drilled at an acute angle towards the axis of the dynamical fuel-oxidant nozzle DFON, but the holes H do not intersect the terminal opening TO of the cap CP. Thus, the actuating oxidant or fuel AO, AF flows from the outlet of one of the injection channels AOIC, AFIC into a respective hole H and exits out the cap CP in the form of a jet at an angle to the jet of fuel F and primary oxidant PO. The jet of actuating fluid intersects the jet of the fuel and primary oxidant after they exit the dynamical fuel-oxidant nozzle DFON. Because the jet of actuating oxidant or fuel AO, AF intersects the jet of the fuel F and primary oxidant PO, said jet is caused to be bent/diverted in a direction away from the jet of actuating oxidant or fuel AO, AF.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention.

What is claimed is:

1. A process for melting a solid charge in a furnace, said process comprising the steps of:
    feeding a solid charge comprising glass or metal to the furnace;
    injecting a jet of fuel and a primary portion of oxidant into a furnace from a fuel/oxidant nozzle in a burner block;
    causing the jet of fuel and primary oxidant to be directed downward towards the solid charge by initiating injection of a jet of a first actuating fluid downwards towards the jet of fuel and primary oxidant thereby impinging the jet of fuel and primary oxidant, the first actuating fluid being a further portion of oxidant;
    upon the melting of a desired amount of the solid charge, discontinuing injection of the jet of the first actuating fluid;
    reducing an amount of oxidant injected from the fuel/oxidant nozzle as primary oxidant while initiating injection of a secondary portion of oxidant from a pair of secondary lances disposed in the burner block above the fuel/oxidant nozzle until a desired degree of staging of oxidant injection between primary and secondary oxidant and distributed combustion conditions are achieved; and
    withdrawing the molten charge from the furnace.

2. The method of claim 1, wherein the solid charge is scrap metal selected from the group consisting of aluminum, copper, zinc, lead, nickel, cobalt, titanium, chromium, precious metals, and alloys thereof.

3. The method of claim 1, wherein the scrap metal is aluminum or an alloy of aluminium.

4. The method of claim 1, wherein the fuel is a gaseous fuel.

5. The method of claim 1, wherein the fuel is selected from the group consisting of natural gas, butane, propane, and mixtures thereof.

6. The method of claim 1, wherein each oxidant has an oxygen content of at least 65% vol/vol.

7. The method of claim 1, wherein each oxidant has an oxygen content of at least 80% vol/vol.

8. The method of claim 1, wherein each oxidant has an oxygen content of at least 90% vol/vol.

9. The method of claim 8, wherein the secondary portion of oxidant makes up 90-95% of a total amount of oxidant to yield a desired degree of staging.

10. The method of claim 1, wherein injection of the jet of the first actuating fluid is discontinued upon the melting of substantially all of the solid charge.

11. The method of claim 1, wherein the fuel is fuel oil.

12. The method of claim 1, wherein the fuel annularly enshrouds the primary portion of oxidant.

13. The method of claim 1, wherein during at least a portion of time in which said method is performed under distributed combustion conditions, a temperature of the furnace is above the auto-ignition temperature of the fuel.

14. The method of claim 1, wherein the fuel/oxidant nozzle is a concentrically arranged pipe-in-pipe nozzle adapted and configured to inject the fuel from an inner pipe and inject the primary portion of oxidant from an annulus between the inner pipe and an outer pipe.

15. The method of claim 1, wherein during at least a portion of time in which said method is performed under distributed combustion conditions, no visible flame is observable.

16. The method of claim 1, wherein the fuel is fuel oil.

17. A process for melting a solid charge in a furnace, said process comprising the steps of:
    feeding a solid charge comprising glass or metal to the furnace;
    injecting a jet of fuel and a primary portion of oxidant into a furnace from a fuel/oxidant nozzle in a burner block;
    causing the jet of fuel and primary oxidant to be directed downward towards the solid charge by initiating injection of a jet of a first actuating fluid downwards towards the jet of fuel and primary oxidant thereby impinging the jet of fuel and primary oxidant, the first actuating fluid being a further portion of oxidant;
    upon the melting of a desired amount of the solid charge, discontinuing injection of the jet of the first actuating fluid;
    reducing an amount of oxidant injected from the fuel/oxidant nozzle as primary oxidant while initiating injection of a secondary portion of oxidant from a pair of secondary lances disposed in the burner block above the fuel/oxidant nozzle until a desired degree of staging of oxidant injection between primary and secondary oxidant and distributed combustion conditions are achieved; and
    withdrawing the molten charge from the furnace, wherein the furnace is a rotary furnace having a substantially cylindrical refractory wall, a first end wall at one end of the cylindrical refractory wall and a second end wall at the opposite end of the cylindrical refractory wall.

18. The method of claim 17, wherein the secondary portion of oxidant makes up 90-95% of a total amount of oxidant to yield a desired degree of staging.

19. A process for melting a solid charge in a furnace, said process comprising the steps of:
    feeding a solid charge comprising glass or metal to the furnace;
    injecting a jet of fuel and a primary portion of oxidant into a furnace from a fuel/oxidant nozzle in a burner block;
    causing the jet of fuel and primary oxidant to be directed downward towards the solid charge by initiating injection of a jet of a first actuating fluid downwards towards the jet of fuel and primary oxidant thereby impinging the jet of fuel and primary oxidant, the first actuating fluid being a further portion of oxidant;
    upon the melting of a desired amount of the solid charge, discontinuing injection of the jet of the first actuating fluid;
    reducing an amount of oxidant injected from the fuel/oxidant nozzle as primary oxidant while initiating injection of a secondary portion of oxidant from a pair of secondary lances disposed in the burner block above the fuel/oxidant nozzle until a desired degree of staging of oxidant injection between primary and secondary oxidant and distributed combustion conditions are achieved; and
    withdrawing the molten charge from the furnace, wherein a power of the burner is increased while continuing to combust the fuel and oxidant under distributed combustion conditions by:
        proportionally increasing the amount of oxidant injected through the pair of secondary lances as secondary oxidant and through the fuel/oxidant nozzle as primary oxidant; and
        initiating injection of a jet of a second actuating fluid upwards towards the jet of fuel and primary oxidant thereby impinging the jet of fuel and primary oxidant, the second actuating fluid being a further portion of the fuel, the second actuating fluid making up 1-20% vol/vol of a total flow of fuel injected from the fuel/oxidant nozzle and as the second actuating fluid.

20. A process for melting a solid charge in a furnace, said process comprising the steps of:
    feeding a solid charge comprising glass or metal to the furnace;
    injecting a jet of fuel and a primary portion of oxidant into a furnace from a fuel/oxidant nozzle in a burner block;
    causing the jet of fuel and primary oxidant to be directed downward towards the solid charge by initiating injection of a jet of a first actuating fluid downwards towards the jet of fuel and primary oxidant thereby impinging the jet of fuel and primary oxidant, the first actuating fluid being a further portion of oxidant;
    upon the melting of a desired amount of the solid charge, discontinuing injection of the jet of the first actuating fluid;
    reducing an amount of oxidant injected from the fuel/oxidant nozzle as primary oxidant while initiating injection of a secondary portion of oxidant from a pair of secondary lances disposed in the burner block above the fuel/oxidant nozzle until a desired degree of staging of oxidant injection between primary and secondary oxidant and distributed combustion conditions are achieved; and
    withdrawing the molten charge from the furnace, wherein during at least a portion of time in which said method is performed under distributed combustion conditions, the secondary portion of oxidant injected from the secondary lances makes up 90-95% of a total amount of oxidant injected as a primary portion of oxidant from the fuel/oxidant nozzle and from the secondary lances.

* * * * *